United States Patent Office

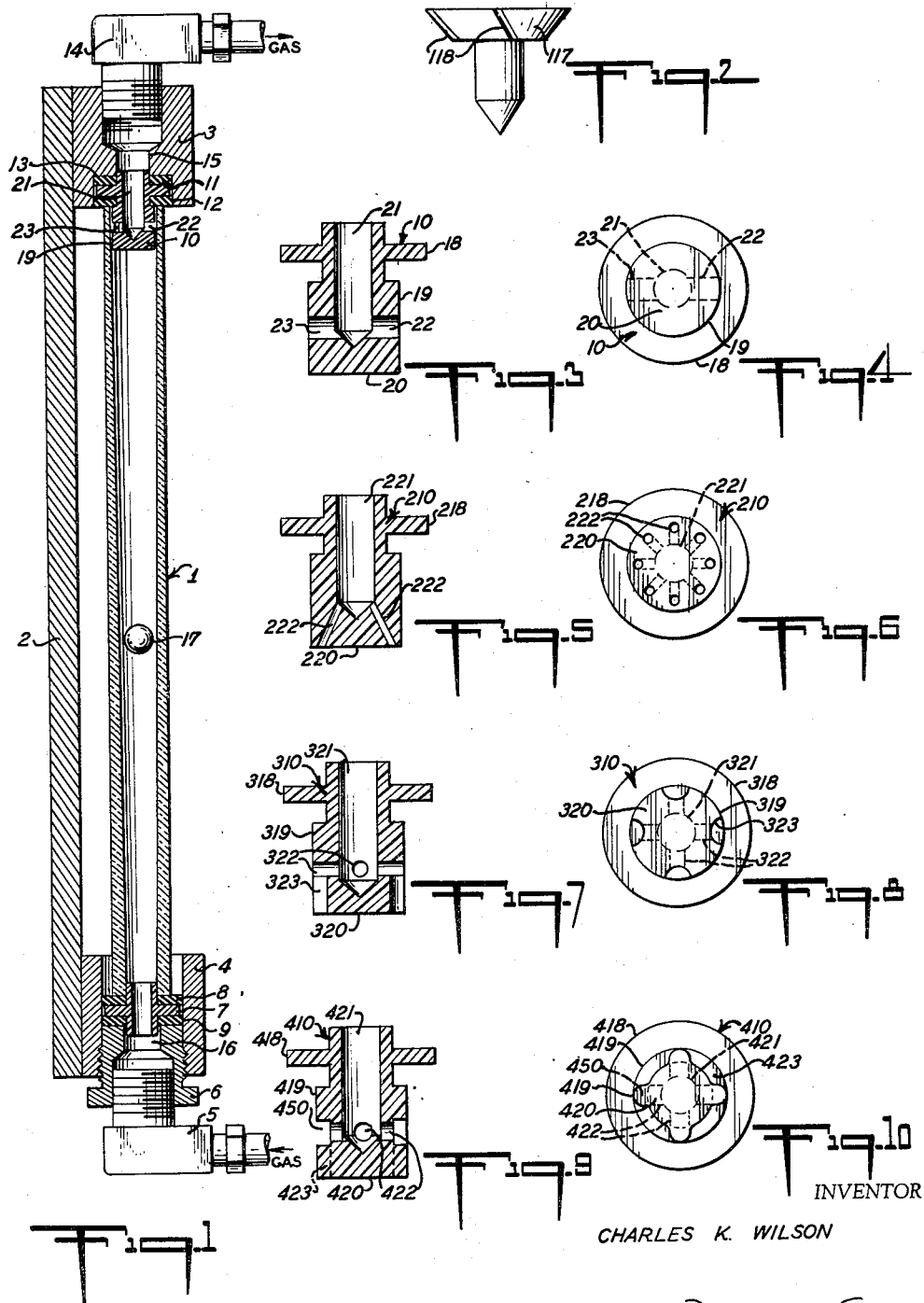

3,141,331
Patented July 21, 1964

3,141,331
FLUID FLOW METERS OF THE VARIABLE ORIFICE TYPE
Charles K. Wilson, East Williston, N.Y., assignor to Metco Inc., a corporation of New Jersey
Filed Oct. 23, 1958, Ser. No. 769,242
2 Claims. (Cl. 73—209)

This invention relates to an improvement in fluid flow meters of the variable orifice type. Orifice-type fluid flow meters are well known for measuring the quantitative flow of fluids such as gases passing therethrough. Meters of this type operate on the principle of measuring the pressure drop across a restrictive orifice placed in the flow line. Meters of this type may use a fixed size orifice, such as a hole in a plate, in which case there is a pressure drop of the fluid from a point in front of to a point behind the orifice; and this pressure drop is a function of the flow.

It is also well known to construct orifice meters with a variable orifice and a constant pressure drop. In this case the size of the orifice is a function of the flow. Meters of this latter type are usually constructed with a tapered tube, in which a fixed size "float" such as a spherical ball is placed. The float is urged upstream in the tapered tube by a predetermined force. The inside diameter of the tube tapers in such a direction as to be larger downstream. It is most common to construct such meters with the tapered tube in a vertical position with the direction of flow upwards through the tube and to depend upon the force of gravity to urge the float downward. The constant flow upwards through the tube raises the float therefore to a position in equilibrium, in which the weight of the float exactly balances the pressure drop through the annular orifice, which is defined by the space between the float and the walls of the tube. This annular orifice is of course a variable orifice, and the height of the float in the tube is proportional to the orifice; hence the height of the float in the tube measures the quantity of flow of the gas therethrough.

It is customary to make the tapered tube of glass, so that the position of the float may be seen and to calibrate the tube or provide a scale adjacent it, so that the height position of the float may readily be measured. Of course other than visual means, such as electronic means, may be used for sensing the position of the float and hence the measure of the flow.

The floats for such meters are frequently made in the shape of a spherical ball of a material of the desired density. It is common to make such floats of stainless steel, of aluminum and of glass. It is also common to make the floats in the shape of a spinning top, symmetrical about the central vertical axis and tapered to a point at the bottom. Sometimes such top-shaped floats have a flange representing the largest diameter, wherein angular serrations are cut so that the flow of gas past the float imparts to it a rotary spinning motion. The purpose of the spinning motion is to add stability of position to the float, both vertically and axially.

A particularly serious problem which has existed and which has never been solved with the use of variable orifice meters of this type has been the breakage of the tapered glass tubes used in the meters. This problem has been aggravated by the fact that the cause of the breakage has never been understood. Breakage due to excessive fluid pressure is not a problem, since it is straightforward to design and test the tubes at a sufficiently high pressure to predict their performance in use. Breakage of the tubes due to a mechanical breakage has not been a problem, due to the fact that it has been practical to design the surrounding and supporting structures to prevent accidental mechanical breakage. Furthermore, mechanical breakage caused such as by slippage of and hitting by a wrench is no mystery to the operator, and he is able to prevent such mechanical breakage by proper precautions.

Nevertheless there has been a continual breakage in the industry using such devices which occurs on a statistical basis among a large number of users and which is a mystery in that no amount of precaution has prevented this breakage.

Another problem experienced with flow meters of this type has been the tendency for the float to remain at the top of the tapered tube after a flow surge, which carried it to such position, even after the flow surge has passed and the float should have returned to a lower position. Such retention at the top of the tube by the float obviously gives a false reading of flow.

It is the object of this invention to provide an improvement in a fluid, such as a gas, flow meter of the variable orifice type, having a tapered glass metering tube which permits continued operation of the meter without breakage of the tube.

It is a further object of this invention to provide an improved flow meter of the variable orifice type which does not give a false reading following a flow surge and in which the float does not tend to stay at the top of the flow metering tube unless that position represents a true reading of the flow through such tube.

These and still further objects will become apparent from the following description read in conjunction with the drawing, in which:

FIG. 1 is a vertical cross section through an embodiment of a flow meter in accordance with this invention;

FIG. 2 shows a side elevation of an alternative construction of a float for such meter;

FIG. 3 is a vertical cross section showing the detailed construction of an upper float stop in accordance with this invention;

FIG. 4 is a plan view of the showing of FIG. 3;

FIG. 5 is a vertical cross section showing an alternative float stop construction in accordance with this invention;

FIG. 6 is a plan view of the showing of FIG. 5;

FIG. 7 is a vertical cross section showing a further alternative float stop construction in accordance with this invention;

FIG. 8 is a plan view of the showing of FIG. 7;

FIG. 9 is a vertical cross section showing a still further alternative float stop construction in accordance with this invention; and FIG. 10 is a plan view of the showing of FIG. 9.

The variable orifice fluid flow meter to which the improvement in accordance with the invention is directed may be generically described as a flow meter having a flow metering tube progressively increasing in inner cross sectional area from its inlet end to its outlet end and having a float in the tube urged toward the inlet end with a substantially uniform force. While the cross sectional shape of the tube is not important, it is generally circular so that the tube is in the form of a narrow truncated cone. The tube is preferably of glass and is substantially vertically positioned so that the force of gravity acting on the float urges the same toward the inlet end of the tube with a substantially uniform force.

The improvement in accordance with the invention comprises a float stop positioned at the outlet end portion of the measuring tube having a substantially flat central uninterrupted surface area extending at right angles to the tube axis and facing the inlet end of the tube, and a fluid outlet flow passage defined outward of this surface area, the uninterrupted surface area being dimensioned so that its outer extremity is no further from the closest point on the inner wall of the tube than one half the diameter of the float. The diameter of the float where the same has a circular cross sectional shape is considered the diameter at the point of greatest thickness and where the float is other than of circular cross sectional shape, the diameter is considered the greatest distance across the float in the direction transverse to the tube axis.

Referring to FIG. 1, 1 is a metering tube of circular cross section, the inside of which is tapered so that its bore becomes larger toward the top. 2 is a meter frame to which are brazed upper and lower support blocks 3 and 4 respectively. L-shaped gas inlet nipple 5 is threadably connected to threaded sleeve 6, which in turn is screwed into support block 4. Lower float stop 7 is pressed between two resilient packing washers 8 and 9 and the end of metering tube 1 and sleeve 6. Upper float stop 10 is pressed between two resilient packing washers 11 and 12 between the end of metering tube 1 and the recessed shoulder 13 in support block 3. L-shaped gas outlet nipple 14 is threadably connected to support block 3. Support block 3 has passage 15 connecting between threaded fitting 14 and shoulder 13 for float stop 10. Sleeve 6 has central passage 16 connected between lower float stop 7 and gas inlet nipple 5. Float 17, which in this case consists of a spherical stainless steel ball, is of a diameter slightly smaller than the inside diameter of the smaller end of tube 1.

FIGS. 3 and 4 show in more detail the construction of upper float stop 10 shown in FIG. 1. Flange 18 extends for sealing between washers 11 and 12. Cylindrical portion 19 is made of a diameter sufficiently smaller than the inside diameter of the upper end of tube 1 to permit full flow of gas through the annular space therebetween; but in accordance with this invention, the diameter of cylinder 19 and hence of the flat surface 20 must be large enough so that at no place is the radial distance between said surface 20 and the inside wall of tube 1 adjacent said surface 20 greater than the radius of float 17. Upper float stop 10 is provided with central passage 21 and side passages 22 and 23.

In operation gas passes through gas inlet fitting 5, through passage 16, through the central bore of lower float stop 7, through tube 1, and through the annular space between float 17 in tube 1, and continuing through tube 1 to and through the annular space between the cylindrical surface 19 of upper float stop 10 and the inside diameter of tube 1, thence through passages 22 and 23 and through passage 21 of upper float stop 10, and thence through passage 15 and out through gas outlet fitting 14. In the course of flowing through the annular space between tube 1 and float 17, a pressure drop is created exactly equal to the weight of float 17, when it is positioned in the equilibrium position for that flow. The height in tube 1 of float 17 is a function of the flow of gas through the meter and hence gives a reading thereof. A suitable scale is provided marked on or engraved on the tube 1, positioned on the support 2, or mounted next to the tube 1, so that a reading may be directly taken.

FIG. 2 shows an alternative top-shaped construction for a float 117, which may be used in meters of this type. Serrations 118 in the outer flange are made at a slight angle so as to impart a rotary motion to the float as the gas passes thereby.

An alternative form of an upper float stop in accordance with this invention is shown in FIGS. 5 and 6. 210 is a float stop with a flange 218 for sealing between washers 11 and 12 (FIG. 1). In this case a central bore 221 connects with a number of small divergent passages 222. In this case the substantially flat surface 220 is of a diameter inside the point where the passages 222 interrupt such surface, such that said uninterrupted area is at no place more than the distance of one-half the diameter of the float 17 from the inside wall of the tube 1 adjacent said surface.

A still further alternative embodiment of an upper float stop in accordance with this invention is shown in FIGS. 7 and 8, in which 310 is the upper float stop with flange 318 for sealing between washers 11 and 12 (FIG. 1) and in which are provided central passages 321. In this case radial passages 322 are provided, and additionally grooves 323 are provided in the cylindrical surface 319 to provide passage of gas past and through the float stop. In this case also the uninterrupted portion of surface 320 extends to within a distance of one-half the radius of float 17 from the inner wall of tube 1 adjacent said surface.

A still further embodiment of an upper float stop in accordance with this invention is illustrated in FIGS. 9 and 10, in which 410 is the float stop with flange 418 for sealing between washers 11 and 12 (FIG. 1) and with central passage 421. In this case an annular groove 450 is provided in cylindrical surface 419, and from the route of said groove 450 are provided passages 422. Large grooves 423 are cut out of the cylindrical surface 419 below annular groove 450. In this case the passage for gas is through spaces 423, into groove 450, through holes 422, and out through passage 421. In this case also the uninterrupted surface 420 of float stop 410 extends over an area which is nowhere further from the inside wall of tube 1 adjacent said surface than one-half the diameter of float 17.

A great many tests have been conducted using conventional known designs and also using constructions in accordance with this invention. Conventional constructions for upper float stops frequently are similar to lower float stop 7 of FIG. 1. The results of these extensive tests indicate that breakage of metering tubes results from some action of the float resulting from a flow surge in the line, even though such flow surge does not cause a pressure surge sufficient to be detrimental to the tube. Repeated tests using this construction in accordance with this invention indicate that such breakage is eliminated.

Repeated tests with conventional meters of this type also show that the float frequently remains in a position adjacent the upper float stop following a flow surge, even after such surge has passed. This gives a false reading. Repeated tests with constructions in accordance with this invention show that there is no tendency for the float to remain adjacent the float stop following a flow surge, but to return immediately to a position representing the correct flow following such surge.

In accordance with some constructions, the metering tube is provided with several internal guide ribs as, for example, three guide ribs in order to accurately guide the float. These ribs, for example, may terminate within the tube at a surface of revolution corresponding to the tube wall with a diameter less than the internal diameter of the tube and slightly greater than the diameter of the float. When providing the new float stop in accordance with the invention, in tubes of this construction the uninterrupted central surface area of the float stop is defined in relation to the inner diameter of the tube and not of the ribs, so that also in this case the uninterrupted surface area must be so dimensioned that its outer extremity is nowhere further from the closest point on the inner wall of the tube than one-half the diameter of the float.

The following examples are given by way of illustration and not of limitation:

*Example 1*

A gas flow meter having the construction as shown in FIG. 1 of the drawing is used. The tube 1 of the meter is constructed of glass having a wall thickness of .096" and the tube has a length of 6½" and an inner diameter at its inlet of .254", an inner diameter at its outlet of .402" and an inner diameter adjacent the upper float stop surface 20 of .393", progressively increasing in cross-sectional area from its inlet to its outlet, so that the same is tapered and in the form of a narrow truncated cone. The float 17 is in the form of a stainless steel ball having a .250" diameter. The meter is first set up with the upper float stop 10 replaced by a conventional float stop consisting of a small piece of nylon flanged tube of .250" outer diameter, ¼" length, and with a bore of .204". An air compressor is connected to an electrically operated solenoid valve by 2½ feet of air hose having an inner diameter of 3/16", and the outlet end of the solenoid valve is connected to the gas inlet of the flow meter by 2½ feet of 3/16" inner diameter hose. Twelve feet of 3/16" inner diameter hose is connected to the gas outlet of the meter and an adjustable needle valve is positioned at the end of the hose.

With the solenoid valve open the pressure in the compressor is built up to 70 pounds per square inch and the needle valve is adjusted until the float ball rises to 70% of full scale value in the flow meter tube. The solenoid valve is then closed. The solenoid valve is then opened by means of a toggle switch, so that there is a surge of gas flow through the meter, causing the float to rapidly rise to its maximum position. The solenoid valve is then closed and the cycle repeated. The glass tube 1 cracks on the second cycle of the set-up.

The pressure is increased to 100 pounds per square inch and the needle valve readjusted to obtain a reading of 90% of full scale and the experiment repeated after the glass tube has been replaced. At this increased pressure the tube cracks on the first cycle.

The tube is replaced with a tube of identical construction and the upper float stop replaced by the float stop 10 in accordance with the invention. This stop is constructed of nylon. The surface 20 has a diameter of .297" forming an annular space of .048" between it and the inner surface of the tube wall. The openings 22 and 23 are of .094" diameter and the bore 21 is of .170" diameter. With air pressure again built up to 100 pounds per square inch and the needle valve adjusted to obtain a reading of 90% of the full scale the solenoid valve is repeatedly opened and closed by hand, allowing sufficient time of about 4 seconds between each opening actuation, to allow the float to settle on the lower float stop. The cycle is repeated 200 times with no apparent damage to the tube 1. An electric timer is then connected to the solenoid valve and set for a 5-second cycle. The timer is allowed to operate for over 1600 cycles with no apparent damage to the tube. The upper float stop in accordance with the invention was then replaced by the conventional float stop first used. The tube cracked on the second cycle.

*Example 2*

The identical set-up described in Example 1 is used. With the conventional upper float stop corresponding to float stop 7 in position, and with the needle valve and solenoid valves open, the air pressure is slowly increased to 90-95 pounds per square inch. With an increase in pressure and increase in flow, the float 17 rises, accurately indicating the flow rate. At pressure of above 70 pounds per square inch and a reading above 70% of full scale, the float tended to cling to the float stop so that it was not possible to obtain accurate reading above 70% of full scale. With the identical set-up and with the upper float stop replaced by float stop 10 in accordance with the invention, this tendency of the float to cling to the upper float stop does not occur and it is possible to obtain accurate readings with pressures up to 90 pounds per square inch and 90% of full scale.

When the upper float stop is replaced with a float stop having the constructions as shown in FIGS. 5, 6, 7, 8, 9 and 10, in accordance with the invention, comparable results are obtained with respect to breakage of the tube and the tendency of the float to cling.

While the invention has been described in detail with reference to certain specific embodiments, various changes and modifications which fall within the spirit of the invention and scope of the appended claims or their equivalent will become apparent to the skilled artisan. It is, therefore, my intention that the invention be limited only by the appended claims or their equivalent wherein I have endeavored to claim broadly all inherent novelty.

I claim:

1. In a variable orifice fluid flow meter having a substantially vertically positioned glass flow metering tube of circular cross sectional shape progressively increasing in inner cross-sectional area in an upward direction from its inlet end to its outlet end and a float freely positioned in the tube, the improvement which comprises a float stop positioned at the upper outlet end portion of the tube having a substantially flat circular central uninterrupted surface area extending at right angles to the tube axis and facing downwardly toward the inlet end of the tube, and a fluid outlet flow passage defined outwardly of said surface area by a multiple number of anularly positioned passages between the tube wall and said area, said passages extending downstream past said surface area, said uninterrupted surface area being dimensioned so that its outer extremity is nowhere further from the closest point on the inner wall of said tube than ½ the diameter of said float.

2. Improvement according to claim 1 in which said float is in the form of a ball.

References Cited in the file of this patent

UNITED STATES PATENTS

| | | |
|---|---|---|
| 2,211,196 | Bristow | Aug. 13, 1940 |
| 2,260,516 | Gerber | Oct. 28, 1941 |
| 2,311,181 | Bowen | Feb. 16, 1943 |
| 2,333,884 | Porter | Nov. 9, 1943 |
| 2,645,124 | Senesky | July 14, 1953 |
| 2,707,879 | Dwyer | May 10, 1955 |
| 2,912,858 | Fuller | Nov. 17, 1959 |
| 2,957,494 | Stenberg | Oct. 25, 1960 |

FOREIGN PATENTS

| | | |
|---|---|---|
| 8,377 | Great Britain | July 5, 1890 |
| 573,359 | Germany | Mar. 30, 1933 |
| 252,803 | Switzerland | Jan. 31, 1948 |
| 1,087,406 | France | Feb. 23, 1955 |